W. T. F. SMITH.
Corn-Planters.
No. 133,808. Patented Dec. 10, 1872.
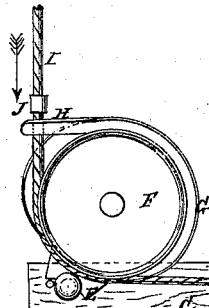
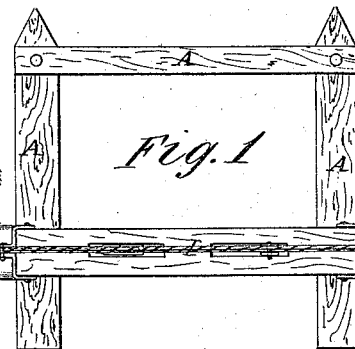
Fig. 1
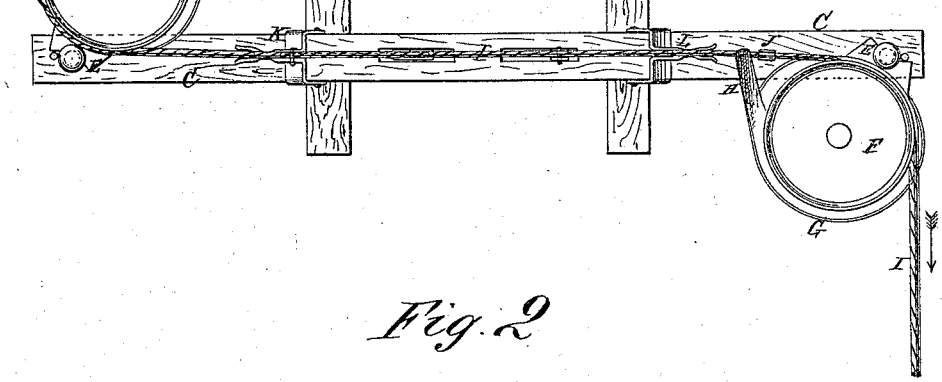
Fig. 2
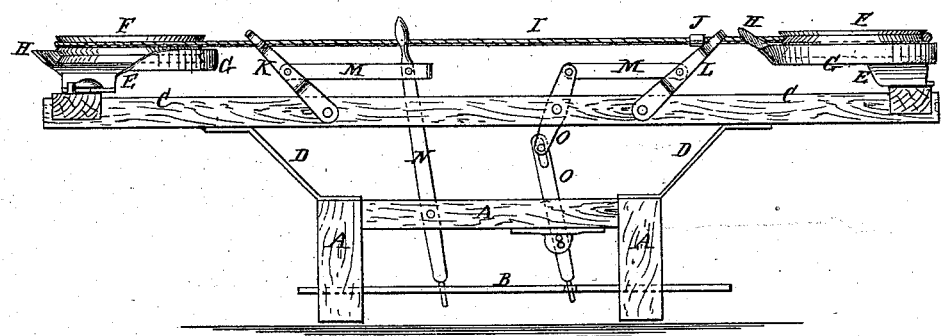
Fig. 3
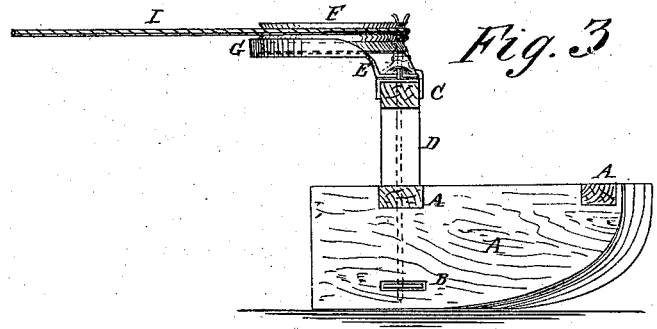
Fig. 4
Witnesses:
A. W. Almqvist
C. Sedgwick
Inventor:
W. T. F. Smith
PER Munn & Co
Attorneys.

UNITED STATES PATENT OFFICE.

WILLIAM T. F. SMITH, OF LEXINGTON, ILLINOIS.

IMPROVEMENT IN CORN-PLANTERS.

Specification forming part of Letters Patent No. 133,808, dated December 10, 1872.

*To all whom it may concern:*

Be it known that I, WILLIAM T. F. SMITH, of Lexington, in the county of McLean and State of Illinois, have invented a new and useful Improvement in Check-Row Corn-Planter, of which the following is a specification:

Figure 1 is a top view of my improved device. Fig. 2 is a rear view of the same. Fig. 3 is a side view of the same. Fig. 4 is a detail view of a piece of the metal bar for forming the knobs for the rope.

Similar letters of reference indicate corresponding parts.

My invention has for its object to furnish an improved device for planting corn, which shall be so constructed as to enable the corn to be planted in perfect check-row, and which shall be simple in construction, convenient in use, and reliable in operation; and it consists in the construction and combination of the various parts of the device, as hereinafter more fully described.

A represents the frame-work of a planter. B is the slide by which the seed is removed from the hoppers, which hoppers are not shown in the drawing. C is a bar of suitable length, which is connected with and supported from the frame-work A by braces D. To the bar C, near its ends, are pivoted the pulley-holders E, which rise a little above the bar C, and the movements of which are limited by stop-pins attached to said bar, and which enter notches in the bases of the holders E, as shown in Fig. 1. To the free or raised part of the holders E are pivoted the pulleys or rope-wheels F, which are made with two grooves, as shown in Figs. 2 and 3. The pulleys F are provided with shields G H attached to the holders E upon the forward sides of the said pulleys F, to keep stalks, weeds, sticks, &c., from passing in to the pulleys, stretching the rope or throwing it off the pulleys, in either case disarranging the hills and sometimes breaking the rope, so that the team has to be stopped, causing delay. The upper shield H is above the rope, reaches just to it, and slopes toward the planter. The lower shield G is below the rope, projects from the planter, and is of sufficient length to keep the rope from falling below the pulley-groove when placing the said rope upon the pulley, and to cause the trash to slide off. I is the rope, the ends of which are secured at the opposite sides of the field by stakes or other means. The rope I passes around the two pulleys F and across the machine, as shown in Figs. 1 and 2. Upon the rope I, at suitable distances apart, are secured metallic knobs J, to operate the lever or tilters, as hereinafter described. The knobs J are made of bars of some metal of sufficient hardness, which are grooved longitudinally, as shown in Fig. 4, so that when cut into pieces of suitable length and wrapped around the rope they may clamp the rope transversely, and thus be prevented from slipping. K L are two levers pivoted to the bar C, and their upper ends are forked to receive the rope I, said forks being made of such a size that the plain rope will slide through freely, but the knobs J will catch and carry the forked end of the levers with them until the levers incline so much as to allow the knobs to slip out of the forks. To the middle part of the levers K L are pivoted the outer ends of the connecting-bars M, the inner ends of which are pivoted to the upper ends of the levers N O. The levers N O pass down through slots in the bar C and in the cross-bar of the frame A, and their lower ends are pivoted to the dropping-slide B. The lever N is rigid and is pivoted to the cross-bar of the frame A. The lever O is made in two parts pivoted to each other, the pivoting-pin passing through a short slot in the end of one of said parts, so that the parts can operate while pivoted to fixed supports, and while their adjacent ends are pivoted to each other. The upper part of the lever O is pivoted to the bar C, and the lower part is pivoted to the cross-bar of the frame A, or to a support attached to said cross-bar.

By this construction the movement of the rope I continuously in the same direction will operate the dropping-slide B alternately in opposite directions, the knobs J being arranged at such a distance apart as to operate the slide B and drop the corn at the proper points.

Having thus described my invention, I claim as new and desire to secure by Letters Patent—

The combination, with knobbed rope I, pulleys F, and forks K L, of the straps M M and levers N O O, when arranged as described, to operate the slide B.

W. T. F. SMITH.

Witnesses:
W. H. SHEPHERD,
HIRAM F. DAVIS.